United States Patent [19]

Yamamoto

[11] 4,318,629
[45] Mar. 9, 1982

[54] COUPLING APPARATUSES

[76] Inventor: Heihachiro Yamamoto, 6-43-10, Nogata Nakano, Tokyo, Japan

[21] Appl. No.: 121,809

[22] Filed: Feb. 15, 1980

[51] Int. Cl.$^3$ ............... F16B 7/00; F16B 12/36; F16B 13/00
[52] U.S. Cl. .................. 403/297; 403/172; 403/176; 403/316
[58] Field of Search .............. 403/297, 171, 172, 176, 403/195, 196, 316

[56] References Cited

U.S. PATENT DOCUMENTS 3,620,558  11/1972  MacMillan ............... 403/297 X
3,958,889  5/1976  Berkowitz ............... 403/297 X
4,146,341  5/1979  Smith ................... 403/297 X

*Primary Examiner*—Wayne L. Shedd
*Attorney, Agent, or Firm*—McGlew and Tuttle

[57] ABSTRACT

An apparatus for coupling tubular frame members is disclosed. A coupling block has a plurality of couplings extended therefrom. Each coupling has a guide recess, a clamp mounted for sliding movement within each guide recess, a bolt having a first end connected with the clamp and a second end screwed into the coupling. The clamp is provided with a hole which receives the first end of the bolt. A bearing within the hole supports the bolt at the first end for free turning movement. The bolt has a circular groove adjacent the first end, and a pin is mounted to the clamp and extended through said circular groove. The clamp is operable to slide responsive to the rotation of the bolt within the guide recess to press the tubular frame member surrounding said clamp and the coupling defining the respective guide recess thereby solidly holding said coupling and tubular frame member to each other.

6 Claims, 6 Drawing Figures

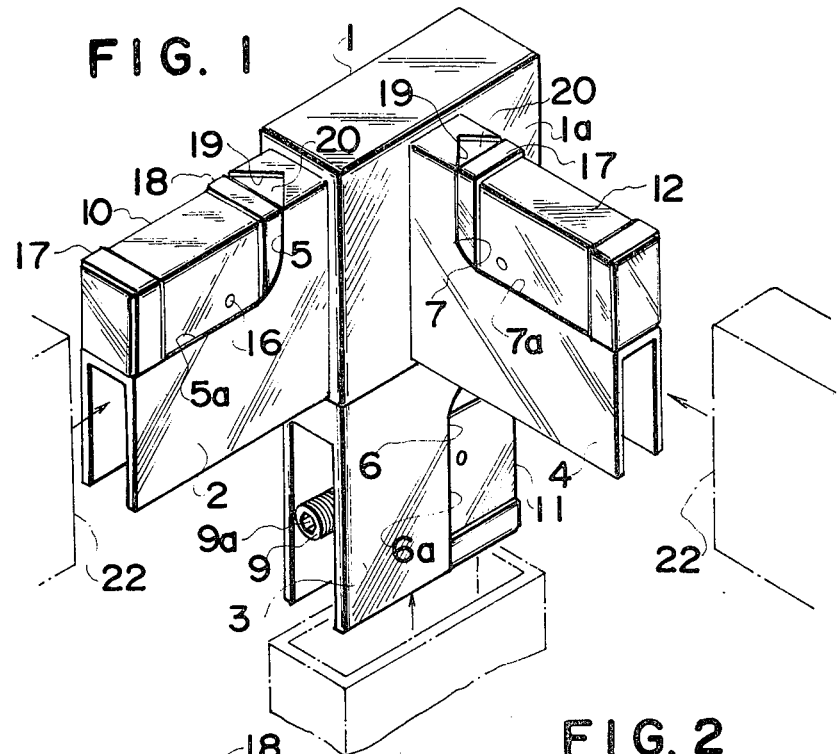
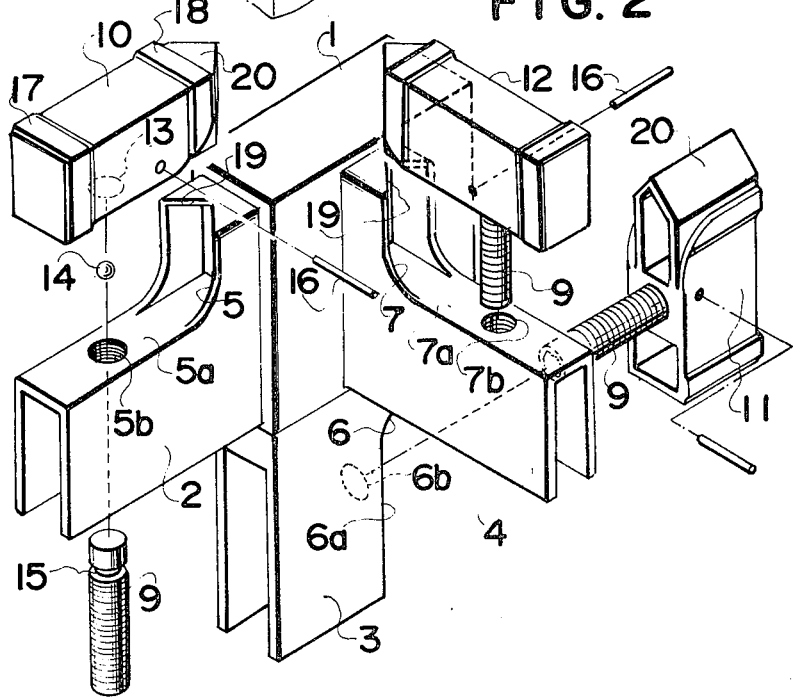

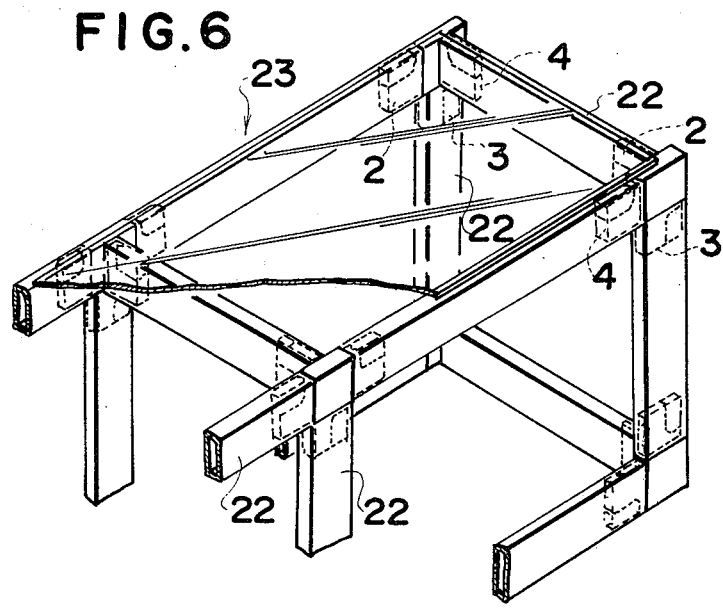
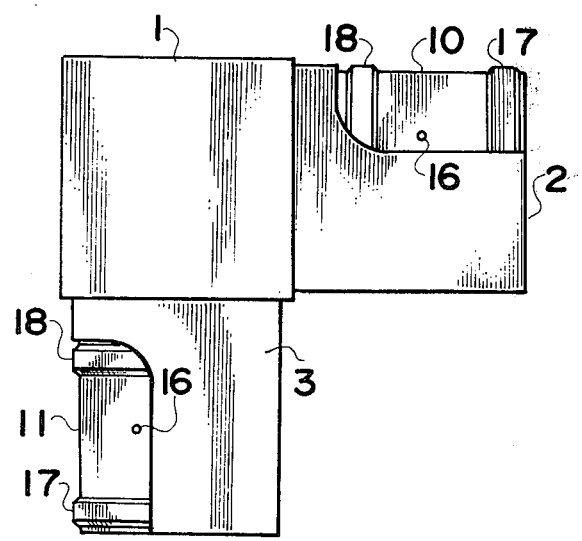

COUPLING APPARATUSES

FIELD AND BACKGROUND OF THE INVENTION

The present invention relates to coupling apparatuses, particularly coupling apparatuses used for forming a rack, display case or furniture by connecting rectangular flat sheet assembly members.

A conventionally known rack or case for displaying merchandise is formed by combining many blocks with plural couplings, with many frames to be connected to the plural couplings. In this case, while such a display case can be easily assembled or carried, the connected portions of couplings are liable to become loose, causing frames to easily disengage, to further cause shelves on them to drop, or to fall the frames. For this reason, in conventional coupling apparatuses, set-screws for preventing the loosening are additionally tightened in the connected portions between the couplings and the frames fitted thereto. However, in such coupling apparatuses, while the above mentioned trouble can be prevented, the screw tightening work for the connection is very troublesome, and when a number of the couplings and frames are used, fatigue is involved and the assembling efficiency is very low.

Furthermore, there are also conventionally known blocks with square or cylindrical couplings, each coupling of which has a rib protruding around it, so that the coupling may be inserted into a square or cylindrical frame through the rib. However, in this case, the coupling is fitted into the frame with striking the block by a hammer, or the like, and for removing, the block is struck by a hammer in the other direction. Therefore, in addition to low working efficiency, not only the coupling apparatuses but also the frames may be broken.

A conventional rack for displaying merchandise is formed by combining tubular frames or square frames horizontally and vertically. Many kinds of coupling members are used to combine these tubular and square frames. However, while attention has been recently paid to a rack which uses rectangular flat sheets, there are no couplings for combining them, and conventional couplings cannot be used for them at all.

SUMMARY OF THE INVENTION

Thus, an object of the present invention is to provide coupling apparatuses which can connect rectangular frame members both vertically and horizontally.

Another object of the present invention is to provide coupling apparatuses which can connect rectangular frame members just by turning screws from outside without using a hammer.

A further object of the present invention is to provide a coupling apparatus having plural couplings, each coupling being provided with a clamp plate capable of moving freely, to enable frame members to be fitted thereto by the movement of the clamp plates.

A still further object of the present invention is to provide coupling apparatuses used for assembling a rack for displaying merchandise, which is formed by rectangular frames.

A further specific object of the present invention is to provide coupling apparatuses compact in structure and high in working efficiency.

Below is described an embodiment of the present invention in reference to the drawings.

BRIEF DESCRIPTION OF THE DRAWINGS

FIG. 1 is a perspective view of a coupling apparatus.

FIG. 2 is a perspective view of the disassembled coupling apparatus of FIG. 1.

FIG. 3 is a front view of the coupling apparatus.

FIG. 6 is a partially cutaway perspective view of a merchandise display rack assembled by using the coupling apparatuses.

DETAILED DESCRIPTION

Figure 4:
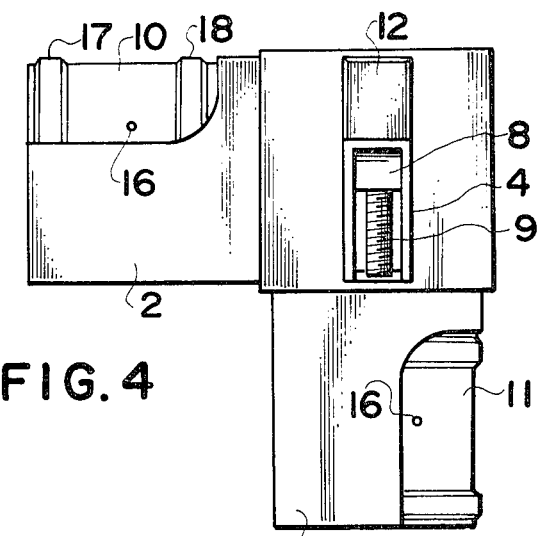
FIG. 4 is a rear view of the coupling apparatus.
Figure 5:
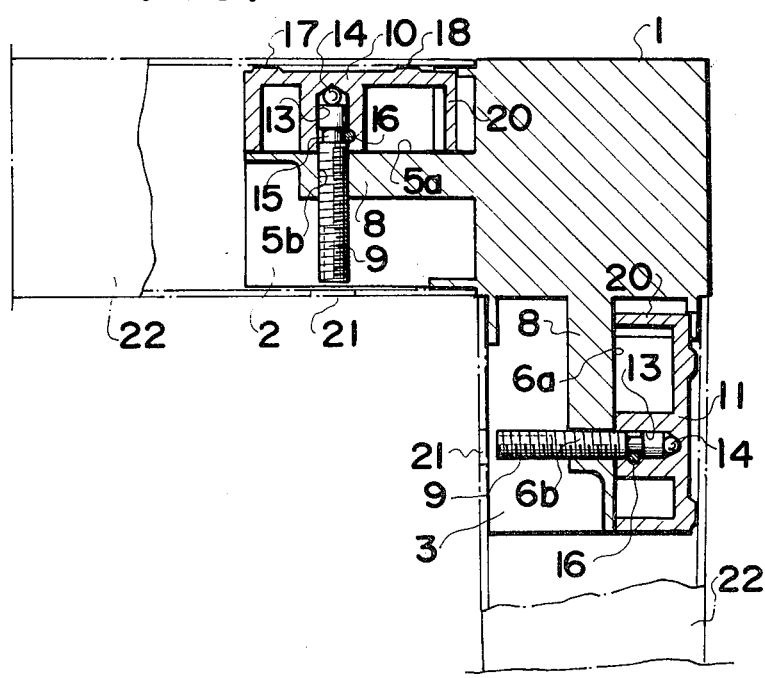
FIG. 5 is a longitudinal sectional rear view of the coupling apparatus.

FIG. 1 is an enlarged perspective view of a coupling apparatus of the present invention. Symbol 1 is a rectangular coupling block with coupling, 2, 3 and 4 protruded in three orthogonal directions, and each of the couplings 2, 3 and 4 has a recess, characterized herein as a cut, 5, 6 or 7 at the top. The horizontal portions 5a, 6a and 7a of the cuts 5, 6 and 7 have a bolt hole 5b, 6b or 7b at the center. It is important that the coupling 4 is protruded at the center of a wide area 1a of the block 1, for combining a rectangular frame. The couplings 2, 3 and 4 are opened below, to make the inside hollow for reduction of weight, but this is not always required. The couplings can be thick branches.

The inside top wall of each coupling 2, 3 or 4 is formed as a slight thick portion 8 which is provided with said bolt hole 5b, 6b or 7b with the inside circumference threaded, and a bolt 9 is screwed in each of the bolt holes 5b, 6b and 7b, to be capable of freely moving.

Inside said cuts 5, 6 or 7, clamp members 10, 11 and 12 are respectively stored, to be capable of freely moving vertically.

Each of said clamp members 10, 11 and 12 has a hole 13 in opposite to the bolt hole 5b, 6b or 7b, and in the hole 13, a ball bearing 14 is set deep inside, to be capable of freely rotating, so that when the bolt 9 is inserted in the hole 13, the top surface of the bolt may contact the ball bearing 14, to be able to be turned easily.

The top end of the bolt 9 has a horizontal surface, and the bottom end of the bolt 9 has a slit or hexagonal hole 9a, so that a screw-driver or a hexagonal wrench, etc may be inserted into the slit or hole 9a, to turn the bolt 9. Furthermore, near the top of the bolt 9, a circular groove 15 is formed around it. On the other hand, at the inside wall of the hole 13 in each of the clamp members 10, 11 and 12, a pin 16 is inserted laterally through. Thus, when the bolt 9 is inserted in the hole 13, the top surface is supported by the ball bearing 14, to be capable of freely turning, and the pin 16 fits the circular groove 15 laterally, so that the bolt 9 may be prevented from coming off axially by the pin 16, while it can be turned freely in the hole 13.

The clamp members 10, 11 and 12 are plates of almost square prism, and they can be partially made hollow for reduction in weight and saving of material, and their external form is only required to move vertically being guided by the cut 5, 6 or 7. Furthermore, as illustrated, ribs 17 and 18 can be protruded on both sides, so that a frame, when fitted, may be supported by the two points, as described later. In this case, since a frame is supported by two points, the state of fitting is stable, and frictional resistance is increased.

At the top of the root or base of each coupling 2, 3 or 4, adjacent block 1, a V-shaped or similar guide groove 19 is formed in the coupling, and a guide 20 triangular in section to fit the guide groove 19 is protruded at an end of each clamp member 10, 11 or 12, so that the clamp members 10, 11 and 12 may move vertically and be controlled in lateral movement by the guide 20 and the guide groove 19.

Now, an operation is described below, in reference to a case where a rack 23 for displaying merchandise comprising rectangular tubular frame members 22, for example, is assembled by using the coupling apparatuses of the present invention.

The coupling apparatuses have their clamp members 10, 11 and 12 held in the extreme compression position in the cuts 5, 6 and 7, as shown in FIGS. 1 and 4, before being fitted to the display rack 23.

Then, as if to cover the respective couplings 2, 3 and 4 and the clamp members 10, 11 and 12, the tubular frame members 22 are slid over the ends of the couplings 2, 3 and 4 to abut block 1. When the frame members 22 are sufficiently put to the roots of the couplings 2, 3 and 4 at block 1, a screwdriver is inserted through an oblong hole 21 provided in each of the frame members 22 from outside in the bolt 9 direction, with its tip fitted in the engagement slit 9a of the bolt 9, in order to turn the bolt 9 clockwise. Thus, the bolt 9 is turned freely in the hole 13 of the cut, being supported by said ball bearing 14. In this case, since the clamp member 10, 11 or 12 is connected with the bolt 9 through the pin 16 and since the screw hole 5b, 6b or 7b is fixed to the block 1, the turning of the bolt 9 makes the bolt 9 and the clamp member 10, 11 or 12 move upward, being guided by the screw hole 5b, 6b or 7b. The clamp member 10, 11 or 12 is moved vertically, being guided by the guide groove 19, and the outer surfaces of the ribs 17 and 18 contact the inside surface of the frame member 22, making the rising force of the clamp member 10, 11 or 12 act on the frame member 22. Thus, the frame 22 is caught between the ribs 17 and 18 of the clamp member 10, 11 or 12 and the lower end of the coupling 2, 3 or 4, and cannot be drawn out of the block 1. Thus, the frame members 22 are held firmly by the couplings 2, 3 and 4, to be prevented from coming off freely. FIG. 6 shows a part of the display rack 23 formed by this method. If the blocks 1 with said three couplings 2, 3 and 4 are combined with the frame members, a display rack of a desired size can be formed, and if glass sheets, or the like, are placed in the rack, a large number of and various kinds of merchandise can be displayed.

As described so far in detail, according to the present invention, by forming guide cuts in the couplings of a block with one or more couplings; fitting a clamp member capable of freely ascending and descending and provided with a screw in it, in each of said guide cuts, to be capable of freely moving vertically; and sliding a rectangular frame over the coupling so as to surround the coupling and the clamp member; whereby when the screw is tightened, said clamp member presses the coupling and the frame member, to hold them solidly; then a display rack or furniture formed by connecting plural frame members can be simply and definitely assembled, and the collapse of shelves due to the disassembly of the frame members and the damage of merchandise and fixtures can be prevented. Thus, the present invention is very practical in markets and households.

I claim:

1. An apparatus for coupling tubular frame members comprising a coupling block, a plurality of couplings extended from said coupling block, each of said couplings having a guide recess, a clamp member mounted for sliding movement within each guide recess, a bolt having a first end connected with said clamp member and a second end screwed into one of said couplings, said clamp member having a hole, said first end of said bolt being received within said hole, bearing means within said hole for supporting said bolt at said first end for free turning movement, said bolt having a circular groove adjacent said first end, and a pin mounted to said clamp member and extended through said circular groove, and said clamp member being operable to slide responsive to the rotation of said bolt within a respective guide recess to press the tubular frame member surrounding said clamp member and said coupling defining the respective guide recess thereby solidly holding said coupling and tubular frame member to each other.

2. An apparatus as set forth in claim 1, wherein said plurality of couplings comprises three couplings extended in respectively different directions.

3. An apparatus as set forth in claim 1, wherein said plurality of couplings comprises a multiplicity of couplings orthogonally extended from said coupling block in three different directions.

4. An apparatus as set forth in claims 2 or 3, wherein said coupling block is a rectangular coupling block having rectangular surfaces of different areas and at least one of said couplings being extended from the center of the wider of said rectangular surfaces.

5. An apparatus as set forth in claim 2 or 3 further comprising rib means mounted to said clamp member for facilitating engagement of said clamp member to the coupling defining the respective guide recess and the tubular frame member surrounding said clamp member and said coupling.

6. An apparatus as set forth in claim 2 or 3, further comprising a guide having a triangular section mounted to said clamp member adjacent said coupling block, and said coupling having guide means guidingly receiving said guide for guided movement into and out of engagement with said tubular frame member surrounding said clamp member and said coupling.

* * * * *